Nov. 30, 1954  M. O. LONGSTRETH ET AL  2,695,420
FILM STRETCHING DEVICE
Filed Dec. 22, 1952  2 Sheets-Sheet 1
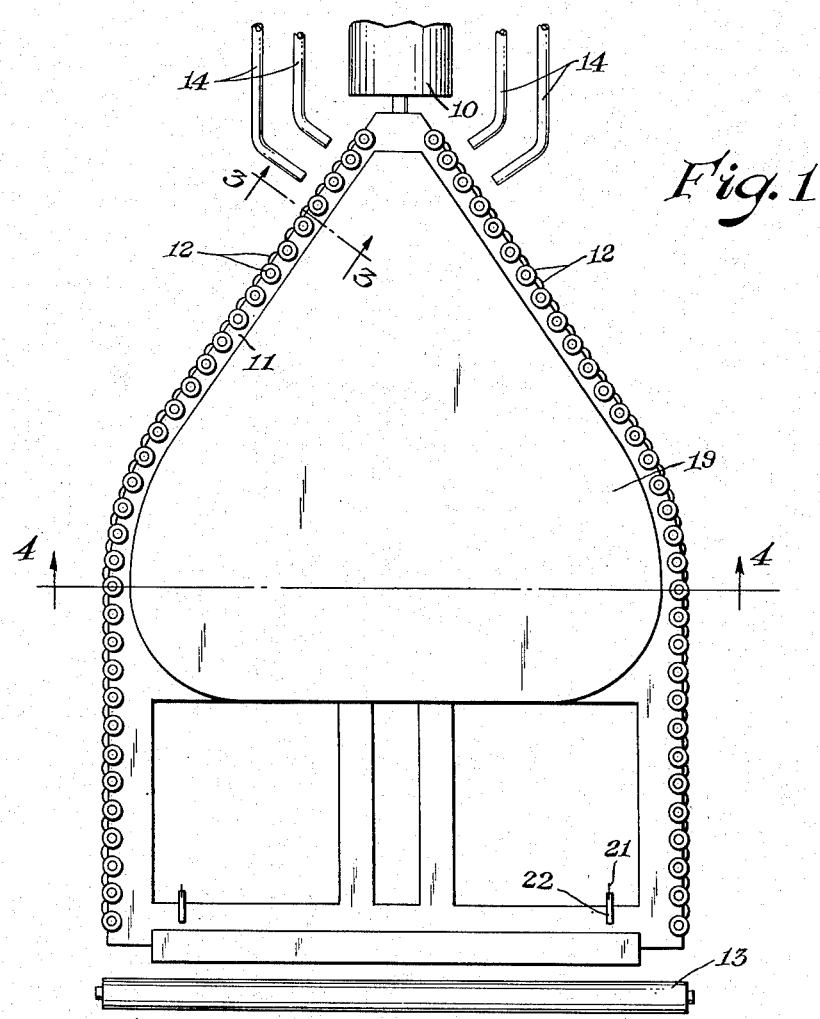
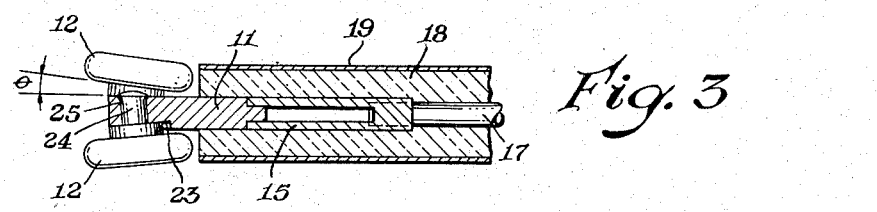
INVENTORS.
Murrey O. Longstreth
BY Daniel W. Ryan
Griswold & Burdick
ATTORNEYS

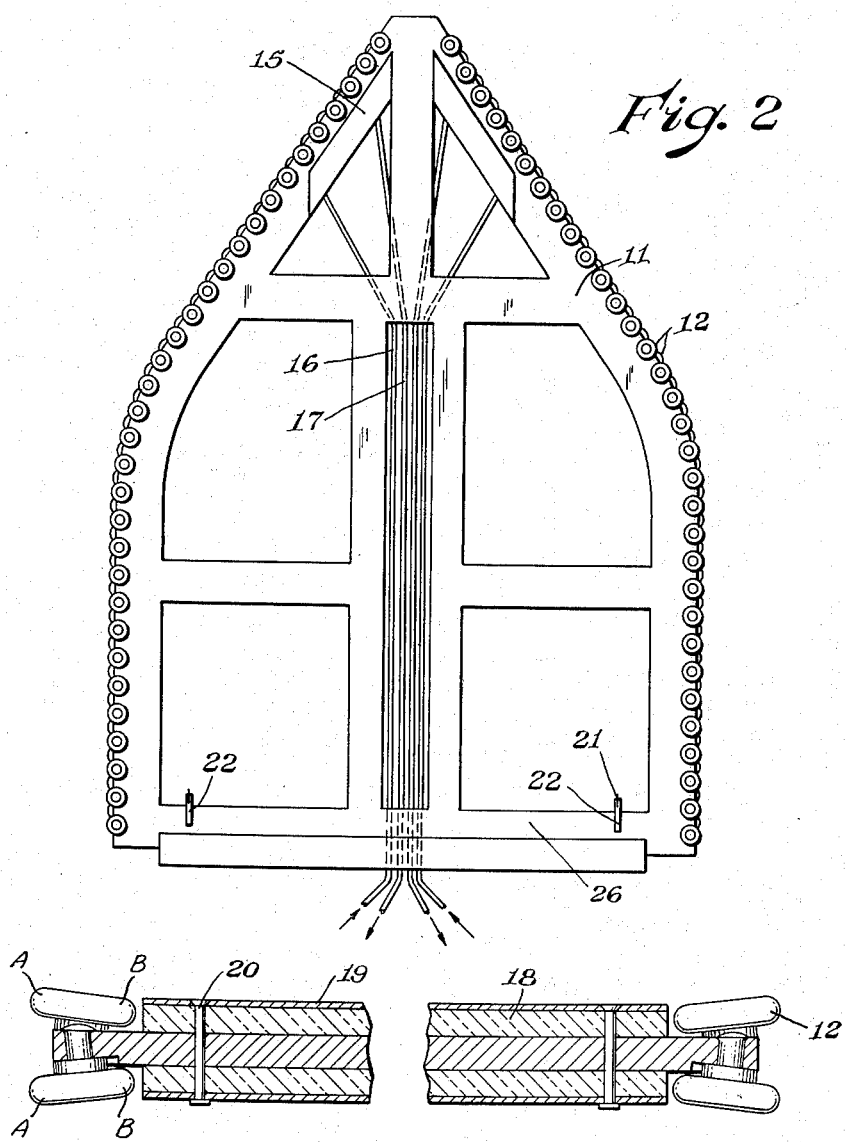

United States Patent Office 2,695,420
Patented Nov. 30, 1954

2,695,420

FILM STRETCHING DEVICE

Murrey O. Longstreth and Daniel W. Ryan, Midland, Mich., assignors to The Dow Chemical Company, Midland, Mich., a corporation of Delaware Application December 22, 1952, Serial No. 327,361

2 Claims. (Cl. 18—1)

This invention relates to an improved device for the stretching or orienting of foils and film.

Films and foils made of certain thermoplastic polymers are highly useful. For example, as described in U. S. Patent 2,074,285, the films made from polystyrene are very valuable as an insulating tape for wrapping electrical cables. Unplasticized polystyrene in its usual state is very brittle, but it is known that when the molecules of polystyrene are arranged or oriented in a certain manner in thin films, the films are flexible and can be readily wound around cables and the like. To accomplish this orientation it is necessary to stretch the material biaxially during production of the film. Various devices have been made for attaining the desired orientation. One of these has been reported by H. Horn in Kunststoffe, 30, pg. 53 (1940). In the method described by Horn, a polystyrene tube is expressed through a circular die and over a divergent spreader mandrel which is attached to the core of the die. The spreader mandrel has a plurality of parallel rollers along its periphery to aid in minimizing the friction between the mandrel and the sliding film. A pair of rolls is located beyond the mandrel and perpendicular to the direction of travel of the film. By operating these rolls at a peripheral speed greater than the speed of the plastic through the die, a simultaneous longitudinal stretch combined with the transverse stretch applied by the mandrel provides the proper biaxial orientation of the polystyrene molecules to attain the desired flexible film. However, when it is attempted to make wide sheets of thin film (1 mil or less), many difficulties are encountered which cause tears or breaks in the film, cause a non-uniform gauge in the film, or otherwise hinder production.

It is an object of this invention to provide an improved film stretching device for imparting a biaxial orientation of the molecules of a thermoplastic film.

It should be understood that the apparatus of the invention is not limited to the orientation of polystyrene, but that any material capable of being formed into a stretchable film may be employed.

The objects of this invention are accomplished by means of a modification of the previously described machine, in which the rollers are inclined at an angle to the plane of the spreader mandrel. By using rollers so inclined, wide films may be made without the aforementioned difficulties.

The construction and operation of the machine will be better understood by reference to the drawings and the following description which represent a preferred embodiment of the invention. In the said drawings, Fig. 1 represents a vertical view of the machine;

Fig. 2 represents a vertical view of the spreader mandrel with the insulating layers removed;

Fig. 3 represents a cross-section of the machine along line 3—3 of Figure 1; and Fig. 4 is a cross-section along line 4—4 of Figure 1.

The machine of which this invention is an improved modification consists of a means for expressing a thermoplastic material through a circular die 10, or other means of supplying an unoriented tubular film, and a divergent spreader mandrel 11 aligned with and attached to the core of the die 10. When so attached, spreader mandrel 11 will be completely within the tube of material. By divergent is meant straight or convex outer edges spreading out symmetrically from the end at which the film is fed onto the spreader mandrel. Concave edges do not give the desired results.

Disposed along the outer edges and on both sides of the mandrel 11 from a point near die 10 are freely rotating rollers 12 which facilitate conveying the tube past the outer edges of the mandrel 11 without frictional drag. It is preferred that the rollers 12 on one face of the mandrel 11 be in staggered relationship to the rollers 12 on the other face of the mandrel 11. Such an arrangement provides maximum support for the hot moving film.

A pair of driven rolls 13 is located beyond the spreader mandrel 11 and extends the width of the mandrel 11, in position to engage the stretched and flattened tube. By operating the rolls 13 at a peripheral speed greater than the speed at which the polymer is being extruded, the rolls provide longitudinal stretch to the film at the same time as the radial stretch imparted by the mandrel 11.

It is preferred to cool the hot film issuing from the die 10 at the points where the film will contact the rollers 12 to prevent it from sticking thereto. A suitable means for cooling the film is a plurality of air jets 14 mounted a short distance away from and in the plane of spreader mandrel 11, so that air streams may be directed at the tube of polymer as it moves over the edge of the mandrel 11. To supplement the cooling effects of the air jets 14, it is preferred to provide a water-jacketed mandrel. An especially suitable form of such a mandrel is described in our concurrently filed application, Serial No. 327,363. In this preferred embodiment water jackets 15 are installed in the edges of the mandrel 11 nearest die 10. Water intake 16 and outlet 17 tubes are connected to jackets 15 so that continuous circulation of a heat transfer liquid is possible.

Since it is desired to cool the film only at the edges of mandrel 11, it is necessary to insulate the other parts of mandrel 11. A suitable means of accomplishing this insulation is described in our concurrently filed application, Serial No. 327,363. In the embodiment described in that application, a layer 18 of insulating material, such as glass wool, covers mandrel 11 at least as low as the lower edge of the water jacket 15, and as wide as the distance between the rollers 12. A sheet 19 of stainless steel or other suitable material, which may be held in place with bolts 20, holds the insulating material in position.

The tube of stretched polymer may be slit into two flat sheets. Suitable means for slitting the tube are described in our concurrently filed application, Serial No. 327,362, and comprise sharp edged cutting devices 21, such as razor blades, mounted in brackets 22 rigidly attached to spreader mandrel 11.

The improved modification of the above described machine which constitutes this invention consists of inclining the film-contacting portions of rollers 12 away from the plane of mandrel 11. A preferred method of mounting the rollers 12 consists of cutting niches 23 along the sides and near the outer edge of mandrel 11. Stub shafts 24 are inserted into holes 25 drilled perpendicularly into the face of the niche 23 nearest the outer edge of mandrel 11. Stub shafts 24 are rigidly held in place by upsetting one end. The rollers 12 are then mounted on stub shafts 24 so as to be freely rotating. The plane of rotation of rollers 12, when mounted in this manner, is cocked outwardly from the plane of the mandrel 11. The angle $\theta$ between the plane of the mandrel 11 and the plane of the roller 12 is preferably from 5 to 45°, although it may be any acute angle. The rollers 12 must have sufficient radius to extend outward beyond the periphery of the mandrel 11.

In operation, a thermoplastic material, such as polystyrene, is expressed through a die 10 so as to form a tube of hot stretchable material. The tube then moves downward and over the spreader mandrel 11 which causes the tube to be transversely stretched. At the point where the tube comes into contact with the mandrel 11, an externally mounted air jet 14 directs a stream of air over that part of the tube which will contact the edges of the mandrel 11. This part of the film is cooled further by conduction from the cooling jackets 15. It is important that only the edges be cooled. Otherwise a non-uniform gauge film will result. The film moves over the edges of the mandrel 11 on freely-rotating rollers 12 which minimize the friction of the film sliding over the edges. The film is stretched longitudinally by a pair of driven rolls 13 extending across the width of the mandrel 11. The tube is slit by razor blades so that two flat sheets are obtained.

By using the improved mounting of the rollers of this invention the film contacts the roller 12 only at point A (Fig. 4) on the periphery of the roller 12 thus giving a minimum of friction between the sliding film and the mandrel 11. In the former machines using rollers 12 parallel to the mandrel 11 the film was in contact with points A and B as well as with the plane surface of any housing sheet 19. The direction of movement of point A and point B relative to the movement of the film is opposite. Such an opposite movement tends to wrinkle and tear the film, especially when wide sheets of film are attempted to be made. Such disadvantages, which have heretofore prohibited the economical production of film, are avoided by the herein-described improved spreader mandrel.

We claim:

1. In an apparatus for stretching previously unoriented tubular film both laterally and longitudinally comprising a spreader mandrel having two parallel plane faces lying between outer edges which diverge symmetrically from the end at which film is fed to said mandrel, of a length and disposed with said outer edges at an angle to provide the desired radial stretch to tubular film advanced thereover; freely rotating film-engaging rollers disposed along the outer edges and on both sides of the mandrel; and a means for applying a longitudinal stretch to the film; the improvement which consists in disposing said rollers at an acute angle divergent from the plane of the spreader mandrel toward their points of film-engagement.

2. An apparatus as claimed in claim 1 in which the rollers are mounted at an angle of from 5° to 45°.

References Cited in the file of this patent

UNITED STATES PATENTS

| Number | Name | Date |
|--------|------|------|
| 2,361,369 | Grebe et al. | Oct. 31, 1944 |

FOREIGN PATENTS

| Number | Country | Date |
|--------|---------|------|
| 431,619 | Great Britain | July 11, 1935 |